(12) United States Patent
Choi et al.

(10) Patent No.: US 11,117,214 B2
(45) Date of Patent: Sep. 14, 2021

(54) LASER IRRADIATION DEVICE AND METHOD

(71) Applicant: Byoung-Chan Choi, Gwangmyeong-si (KR)

(72) Inventors: Byoung-Chan Choi, Gwangmyeong-si (KR); Ki-Seok Kang, Seoul (KR); Lone-Wen Tai, Taichung (TW); Jong-Sik Kim, Pohang-si (KR); Je-Ha Shon, Pohang-si (KR)

(73) Assignee: Byoung-Chan Choi, Gwangmyeong-si (KR)

( * ) Notice: Subject to any disclaimer, the term of this patent is extended or adjusted under 35 U.S.C. 154(b) by 324 days.

(21) Appl. No.: 15/525,955

(22) PCT Filed: Apr. 7, 2015

(86) PCT No.: PCT/KR2015/003469
§ 371 (c)(1),
(2) Date: May 11, 2017

(87) PCT Pub. No.: WO2016/076486
PCT Pub. Date: May 19, 2016

(65) Prior Publication Data
US 2017/0326798 A1    Nov. 16, 2017

(30) Foreign Application Priority Data

Nov. 13, 2014    (KR) .......................... 10-2014-0158194

(51) Int. Cl.
*B23K 26/082*    (2014.01)
*G02B 26/12*    (2006.01)
(Continued)

(52) U.S. Cl.
CPC .......... *B23K 26/082* (2015.10); *B29C 64/268* (2017.08); *B29C 64/393* (2017.08);
(Continued)

(58) Field of Classification Search
None
See application file for complete search history.

(56) References Cited

U.S. PATENT DOCUMENTS 5,053,090 A * 10/1991 Beaman .................. B22F 3/004
264/497
5,293,025 A * 3/1994 Wang ..................... H01L 21/486
219/121.71
(Continued)

FOREIGN PATENT DOCUMENTS

JP          11-033752       2/1999
KR   10-2003-0090042       11/2003
(Continued)

OTHER PUBLICATIONS

KIPO machine translation of KR 10-2006-0012398, retrieved Sep. 10, 2019 (Year: 2006).*
(Continued)

*Primary Examiner* — Timothy Kennedy

(57)    ABSTRACT

A laser irradiation device includes: a beam generation unit generating a laser beam; a scan mirror unit adjusting a direction of the laser beam transmitted from the beam generation unit; and a rotating mirror reflecting the laser beam of which the direction is adjusted by the scan mirror unit. The rotating mirror is provided to be rotatable so that
(Continued)

the direction-adjusted laser beam is irradiated to an object to be processed while forming a linear laser beam on the object.

15 Claims, 12 Drawing Sheets

(51) Int. Cl.
- *B33Y 30/00* (2015.01)
- *B33Y 50/02* (2015.01)
- *B29C 64/393* (2017.01)
- *B29C 64/268* (2017.01)
- *G02B 26/10* (2006.01)
- *G02B 27/09* (2006.01)
- *G02B 27/14* (2006.01)
- *B33Y 10/00* (2015.01)
- *B29C 64/153* (2017.01)

(52) U.S. Cl.
CPC ............... *B33Y 30/00* (2014.12); *B33Y 50/02* (2014.12); *G02B 26/105* (2013.01); *G02B 26/12* (2013.01); *G02B 27/0927* (2013.01); *G02B 27/14* (2013.01); *B29C 64/153* (2017.08); *B33Y 10/00* (2014.12); *G02B 26/124* (2013.01)

(56) References Cited

U.S. PATENT DOCUMENTS

| | | | | |
|---|---|---|---|---|
| 5,541,731 A | * | 7/1996 | Freedenberg | B23K 26/04 219/121.8 |
| 2003/0184835 A1 | * | 10/2003 | Goldberg | B41J 2/473 359/204.5 |
| 2007/0206258 A1 | * | 9/2007 | Malyak | G02B 26/105 345/204 |
| 2011/0228249 A1 | * | 9/2011 | Koehler | G01S 7/481 356/4.01 |

FOREIGN PATENT DOCUMENTS

| | | |
|---|---|---|
| KR | 10-2006-0012398 | 2/2006 |
| KR | 10-0609831 | 8/2006 |
| KR | 10-0847425 | 7/2008 |
| KR | 10-2011-0129635 | 12/2011 |

OTHER PUBLICATIONS

International Search Report for PCT/KR2015/003469, dated Aug. 12, 2015, and its English translation.

* cited by examiner

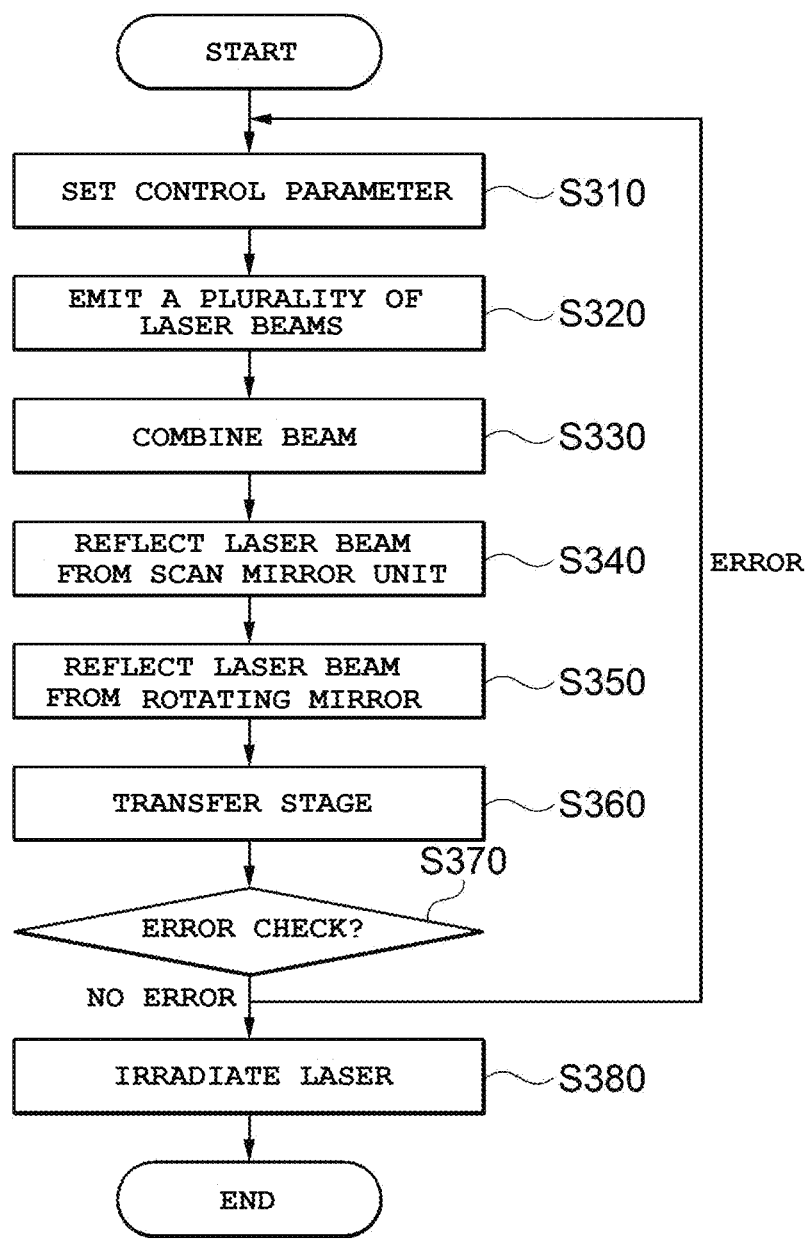

LASER IRRADIATION DEVICE AND METHOD

CROSS-REFERENCE TO RELATED APPLICATION

This application is the National Stage application under 35 U.S.C. 371 of International Application No. PCT/KR2015/003469, filed on Apr. 7, 2015, which claims the benefit of and priority to Korean Patent Application No. 10-2014-0158194, filed on Nov. 13, 2014, which are herein incorporated by reference in its entirety.

TECHNICAL FIELD

The present invention relates to a laser irradiation device and method, and more particularly, to a laser irradiation device and method for rapidly irradiating a laser beam.

BACKGROUND ART

As the process of using laser irradiation, there are three-dimensional printing for producing products having a three-dimensional shape, surface treatment, and semiconductor debonding processes, or the like.

Conventionally, in order to produce a product having a three-dimensional shape, a method of manufacturing a wooden bowl by a manual operation as a design drawing and a manufacturing method by CNC milling are used.

However, since the method of manufacturing the wooden bowl relies on a manual operation, elaborate numerical control is difficult and a lot of time is consumed, and the manufacturing method by CNC milling is capable of elaborate numerical control but has trouble processing various shapes due to tool interference. Therefore, in recent years, a so-called three-dimensional printer for manufacturing prototypes of three-dimensional shapes using a computer storing data generated in the three-dimensional modeling produced by product designers and designers has been developed and used.

The use of the 3D printer can save manufacturing costs and time, realize customized production, and manufacture a complex shape, and thus is expected to lead to significant social and economic ripple effects. For example, it is possible to easily modify the design as well as significantly reduce production costs, material costs, and labor costs when manufacturing prototypes. In addition, it is possible to prevent leakage of confidentiality due to the outside service of prototype manufacturing through in-house production of prototypes, and it is possible to reduce labor costs, assembly costs, or the like by simplifying manufacturing process when the finished product is manufactured. In addition, it is possible to shorten time due to process simplification and integrated production. In addition, even in the case of a small-quantity production, as long as there is only a 3D design file, additional cost is little incurred even if products having different designs are produced every time, and therefore the customized production is easy. In addition, it is easy to manufacture a complicated and hollow shape and greatly reduce materials to be discarded after processing.

The three-dimensional printer completes a shape of an object by horizontally cutting a three-dimensional object very thinly and analyzing the object, irradiating a laser beam to the object, and stacking a thin film from the bottom one by one, like integrating the three-dimensional object as a three-dimensional design drawing. An example of the stacking method may include extrusion, injection, hardening, powder, sintering, drawing, sheet bonding, or the like.

The existing method for irradiating a laser beam for three-dimensional printing irradiates a laser beam to a desired spot using a plurality of scan mirrors that adjust X and Y axes, and has a problem in that a speed is slow and a process time increases because all the objects to be processed are irradiated with laser with a large number of hatching lines. For example, it takes about 2 hours to print a plastic object having a 2.5 mm thick.

RELATED ART DOCUMENT

Patent Document (Patent Document 1) Korean Patent No. 10-0847425 (Jul. 21, 2008)

DISCLOSURE

Technical Problem

An object of the present invention is to provide a laser irradiation device capable of increasing an irradiation speed of a laser beam and shortening process time.

Another object of the present invention is to optimize laser process quality by supporting various laser hatching schemes and using optimized hatching for each irradiation region.

Objects of the embodiment of the present invention are not limited the above-mentioned objects and other objects may be apparently understood to a person skilled in the art to which the present invention pertains from the following description.

Technical Solution

In one general aspect, a laser irradiation device includes: a beam generation unit generating a laser beam; a scan mirror unit adjusting a direction of the laser beam transmitted from the beam generation unit; and a rotating mirror reflecting the laser beam of which the direction is adjusted by the scan mirror unit, in which the rotating mirror may be provided to be rotatable so that the direction-adjusted laser beam is irradiated to an object to be processed while forming a linear laser beam on the object.

The scan mirror unit may include at least one of a first scan mirror adjusting a start point of the laser beam in a first direction parallel to a processed surface of the object to be processed and a second scan mirror uniformly adjusting a gap between the laser beams in a second direction perpendicular to the first direction.

The beam generation unit may have a Gaussian circular beam profile.

The laser irradiation device may further include: a beam conversion unit converting the laser beam into any one of a flat-top circular beam profile, a flat-top square beam profile, and a flat-top line beam profile.

The laser beam may be irradiated on the object to be processed by any one of line hatching, zigzag hatching, circular hatching, spiral hatching, and cross hatching.

The laser beam may be irradiated on the object to be processed to perform any one of three-dimensional printing, surface treatment, and debonding processes.

The laser irradiation device may further include: a stage having the object to be processed, which is a target to which the laser beam is to be irradiated, disposed thereon and moving the object to be processed in a pre-stored direction.

The laser irradiation device may further include: a stage having the object to be processed, which is a target to which the laser beam is to be irradiated, disposed thereon and moving the object to be processed in a pre-stored direction, in which the stage may be transfer the object in state of being interlocked with the second scan mirror adjusting in the second direction.

The stage may include a fixing part for fixing the object to be processed.

The laser irradiation device may further include: a control unit controlling the beam irradiation unit to select a hatching scheme and compensating for an error by adjusting a direction of the laser beam depending on a previously analyzed error value in any one of a case in which the error occurs because the laser beam is not accurately positioned at a pre-stored position of a reflecting surface of the scan mirror unit or a case in which the error occurs because a reflecting surface of the rotating mirror is uneven.

The control unit may use a position sensitivity detector to compensate for an error of the laser irradiation device.

The laser irradiation device may further include: a beam combining optical system provided with a plurality of beam generation units for generating the laser beam and combining different laser beams generated by the plurality of beam generation units.

The laser irradiation device may further include: a beam irradiation device moving a beam irradiation unit that includes the scan mirror unit and the rotating mirror.

The beam irradiation device may further include a beam conversion unit that the laser beam of the beam irradiation unit is reflected to the object to be processed to be irradiated.

The beam irradiation device may further include: a stage having the object to be processed disposed thereon; and a powder roller evenly spreading powder sprayed on the stage.

The laser irradiation device may further include: a half mirror separating and transmitting the laser beam generated from the beam generation unit into a plurality of laser beams; and a plurality of hybrid type scan heads, in which the hybrid type scan head may include the scan mirror unit and the rotating mirror.

The laser irradiation device may further include: a plurality of hybrid type scan heads, in which the hybrid type scan head may include the scan mirror unit and the rotating mirror and the beam generation unit may be provided in plural to irradiate each laser beam generated from the plurality of beam generation units to each of the hybrid type scan heads.

Any one of three-dimensional printing, surface treatment, and debonding processes for a large area and high productivity may be performed.

The laser irradiation device may further include: a stage having the object to be processed disposed thereon; and a powder roller evenly spreading powder sprayed on the stage.

In another general aspect, a laser irradiation method includes: generating, by a beam generation unit, a laser beam; adjusting, by a scan mirror unit, a direction of the laser beam transmitted from the beam generation unit; and reflecting, by a rotating mirror, the laser beam of which direction is adjusted by the scan mirror unit and irradiating the laser beam to the object to be processed, in which the rotating mirror may be rotated to irradiate the direction-adjusted laser beam to the object to be processed as a linear laser beam.

The scan mirror unit may include at least one of a first scan mirror adjusting a start point of the laser beam in a first direction parallel to a processed surface of the object to be processed and a second scan mirror uniformly adjusting a gap between the laser beams in a second direction perpendicular to the first direction.

The laser beam may be irradiated on the object to be processed to perform any one of three-dimensional printing, surface treatment, and debonding processes.

The laser irradiation method may further include: controlling, by a control unit, the beam irradiation unit to select a hatching scheme and compensating for an error by adjusting a direction of the laser beam depending on a previously analyzed error value in any one of a case in which the error occurs because the laser beam is not accurately positioned at a pre-stored position of a reflecting surface of the scan mirror unit or a case in which the error occurs because a reflecting surface of the rotating mirror is uneven.

Advantageous Effects

According to the embodiment of the present invention, the laser irradiation device may markedly increase the irradiation speed of the laser beam.

In addition, it is possible to greatly shorten the process time of the three dimensional printing, surface treatment, debonding processes, or the like.

Further, it is possible to optimize the laser process quality by supporting various laser hatching schemes and using the optimized hatching for each irradiation region.

DESCRIPTION OF DRAWINGS

FIG. 12 is a flowchart for explaining a laser irradiation method by a laser irradiation device according to a fourth embodiment of the present invention.

BEST MODE

Hereinafter, a laser irradiation device according to embodiments of the present invention will be described in detail with reference to FIGS. 1 to 12. However, the exemplary embodiments are described by way of examples only and the present invention is not limited thereto.

In describing the present invention, when a detailed description of well-known technology relating to the present invention may unnecessarily make unclear the spirit of the present invention, a detailed description thereof will be omitted. Further, the following terminologies are defined in consideration of the functions in the present invention and may be construed in different ways by the intention of users and operators. Therefore, the definitions thereof should be construed based on the contents throughout the specification.

As a result, the spirit of the present invention is determined by the claims and the following exemplary embodiments may be provided to efficiently describe the spirit of the present invention to those skilled in the art.

Hereinafter, in describing each component of a laser irradiation device according to an embodiment of the present invention, when specifying a direction for describing positions or mutual relationships of the components included in the laser irradiation device, they will be based on a direction indicated on the drawings.

Figure 1:
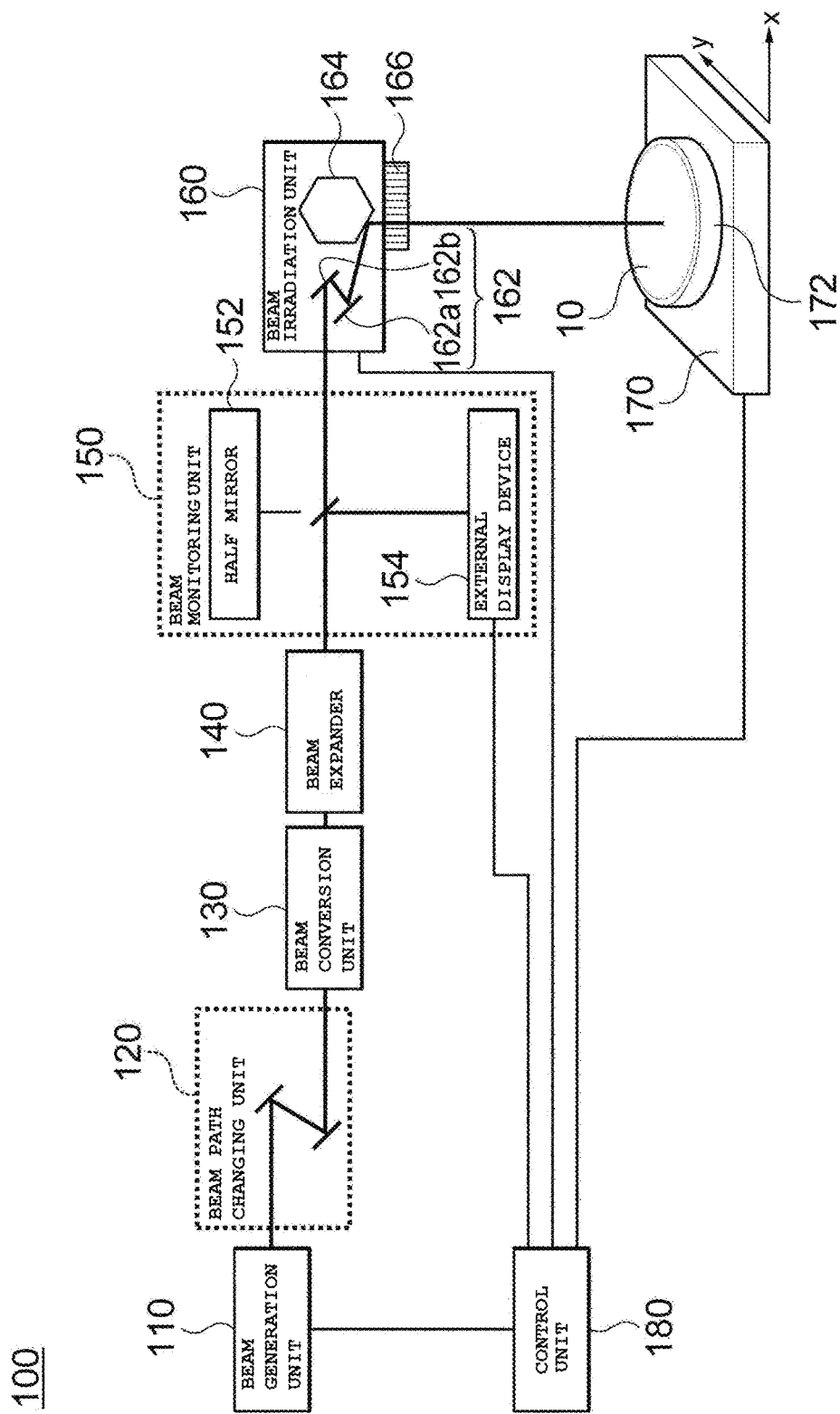
FIG. 1 is a view showing a configuration of a laser irradiation device according to an embodiment of the present invention.

FIG. 1 is a view showing a configuration of a laser irradiation device according to an embodiment of the present invention.

Referring to FIG. 1, a laser irradiation device 100 includes a beam generation unit 110, a beam path changing unit 120, a beam conversion unit 130, a beam expander 140, a beam monitoring unit 150, a beam irradiation unit 160, a stage 170, a control unit 180, and the like.

The laser beam generated from the beam generation unit 110 may pass through the beam irradiation unit 160 via the beam path changing unit 120, the beam conversion unit 130, the beam expander 140, and the beam monitoring unit 150 to be irradiated to an object 10 to be processed placed on the stage 170. At this time, the beam irradiation unit 160 includes a scan mirror unit 162 for adjusting a direction of the laser beam transmitted from the beam generation unit 110, and a rotating mirror 164 for reflecting the laser beam of which direction is adjusted by the scan mirror unit 162. Here, the rotating mirror 164 may be included. Here, the rotating mirror 164 may be rotated so that the laser beam adjusted by the scan mirror unit 162 is irradiated to the object 10 to be processed while forming a linear laser beam. Each of the above components will be described in detail below.

The beam generation unit 110 generates a laser beam for performing three-dimensional printing, surface treatment, or debonding process on the object 10 to be processed. The laser beam generated by the beam generation unit 110 may have a Gaussian circular beam profile.

The beam path changing unit 120 may change a path of the laser beam generated by the beam generation unit 110 to be incident on the beam conversion unit 130. The beam path changing unit 120 may change the beam path by arranging a plurality of reflecting mirrors 121 and 123 on the beam path.

If the laser beam generated by the beam generation unit 110 is incident through the beam path changing unit 120, the beam conversion unit 130 may convert the Gaussian circular beam profile into a flat-top beam profile having a uniform energy distribution and allows the laser beam having the flat-top beam profile to be incident on the beam expander 140.

The beam conversion unit 130 may convert the laser beam into any one of a flat-top circular beam profile, a flat-top square beam profile, and a flat-top line beam profile. Here, the flat-top refers to a shape of an upper layer of the laser beam profile, in which the circular, the square, and the line may represent the shape of the periphery except for the upper layer shape in a three-dimensional manner.

The beam expander 140 may convert a thin parallel light beam of the laser beam, which may be incident from the beam path changing unit 120, into a thick parallel light beam and emit the thick parallel light beam. The beam expander 140 may be disposed at at least one of a front end side and a rear end side of the beam conversion section 130. Alternatively, if the light beam of the laser beam is sufficiently thick, the beam expander 140 may not be disposed at both of them.

The beam monitoring unit 150 may recognize and display at least one of a beam profile and a laser power level for the laser beam converted by the beam conversion unit 130. In addition, if there is a difference between the preset laser power level in and the recognized laser power level the beam generation unit 110, the laser power level is automatically compensated so that the beam generation unit 110 may generate a laser beam at the preset laser power level. The beam monitoring unit 150 may include a half mirror 152 that reflects some of the laser beam and transmits some of the laser beam on the optical path between the beam conversion unit 130 and the beam irradiation unit 160, and may measure the beam profile and the laser power level of the laser beam reflected by the half mirror 152 and compensates for the measurement result based on characteristics of the half mirror 152 and display the corrected measurement result to the outside through an external display device 154.

The beam irradiation unit 160 may irradiate the laser beam to the object 10 to be processed to perform the three-dimensional printing process, the surface treatment process, the debonding process for lowering an adhesion of a bonded adhesive, or the like.

The beam irradiation unit 160 may irradiate the laser beam to the whole surface of the object 10 to be processed or some area of the object 10 to be processed by at least one of a plurality of hatching schemes including line hatching, zigzag hatching, circular hatching, spiral hatching, or cross hatching.

The beam irradiation unit 160 may be configured of a hybrid type scan head that includes a scan mirror unit 162 including a plurality of scan mirrors 162a and 162b and a rotating mirror 164 for rapidly irradiating laser reflected from the scan mirror unit 162 to the object 10 to be processed. Here, the hybrid type scan head may mean including the scan mirror unit 162 and the rotating mirror 164. Further, the beam irradiation unit 60 may further include a scan lens 166 that allows the laser beam to reach the object 10 to be processed. The scan mirror unit 162 may include two or more scan mirrors 162a and 162b. The beam irradiation unit 160 may adjust and change the position of the laser beam irradiated to the object 10 to be processed by the rotation of the scan mirrors 162a and 162b. For example, the first scan mirror 162a may be rotated clockwise or counterclockwise by setting a protruding direction on a paper face of FIG. 1 as a rotation axis. Accordingly, the first scan mirror 162a may adjust a starting point of the laser beam by adjusting an X-axis irradiation direction of the laser beam irradiated to the object 10 to be processed. In addition, the second scan mirror 162b may be rotated clockwise or counterclockwise by setting left and right directions of the second scan mirror 162b as a rotation axis on the paper face of FIG. 1. Accordingly, the second scan mirror 162b may adjust a Y-axis irradiation direction of the laser beam irradiated to the object 10 to be processed to adjust a gap between the laser beams to be constant. Here, it is described that the first scan mirror 162a adjusts the X-axis irradiation direction and the second scan mirror 162b adjusts the Y-axis irradiation direction. However, the first scan mirror 162a and the second scan mirror 162b may vary depending on the setting of the rotation axis. For example, the first scan mirror 162a may be rotated clockwise or counterclockwise by setting the left and right directions of the first scan mirror 162a on the paper face of FIG. 1 as the rotation axis. Accordingly, the first scan mirror 162a may adjust the Y-axis irradiation direction of the laser beam irradiated to the object 10 to be processed to adjust the gap between the laser beams to be constant. Further, the second scan mirror 162a may be rotated clockwise or counterclockwise by setting the protruding direction on the paper face of FIG. 1 as the rotation axis. Accordingly, the second scan mirror 162b may adjust the starting point of the laser beam by adjusting the X-axis irradiation direction of the laser beam irradiated to the object 10 to be processed. In addition, the beam irradiation unit 160 may be transferred under the control of the control unit 180 to adjust the starting point of the laser beams and the gap between the laser beams.

The proceeding sequence for the positions and the laser irradiation of the structure of the scan mirror unit 162 and the rotating mirror 164 of the beam irradiation unit 160 may be variously changed. For example, after the laser beam passing through the half mirror 152 passes through the rotating mirror 164, the laser beam may be reflected to the scan mirror unit 162 to be irradiated to the object 10 to be processed. Alternatively, as shown in FIG. 1, the laser beam passes through the scan mirror unit 162, and then may be irradiated to the object to be processed by the rotating mirror 164. In this case, the previously adjusted laser beam is incident on the rotating mirror 164, and thus the position of the laser beam is adjusted and then the linear laser beam may be formed by the rotating mirror 160, such that the accuracy of the beam may be more improved.

The stage 170 may be provided so that the object 10 to be processed to which the laser beam is irradiated may be placed thereon. The stage 170 may have a shape of either a polygon or a circle. The stage 170 may include a fixing part 172 for fixing the object 10 to be processed. The fixing part 172 may prevent the object 10 from moving while the laser beam is irradiated. Further, the stage 170 may be transferred under the control of the control unit 180.

The control unit 180 controls the laser irradiation device 100 configured as described above, and may be embodied in a device such as a computer in a program form. The three-dimensional printing, surface treatment, or debonding process may be performed under the control of the control unit 180. The control unit 180 may control the operations of the beam generation unit 110 and the beam irradiation unit 160. Further, the beam irradiation unit 160 may irradiate the laser beam using any one of the plurality of preset hatching schemes according to the materials of the object 10 to be processed under the control of the control unit 180. Further, the control unit 180 may control the transfer of the stage 170, the transfer of the beam irradiation unit 160, or the rotation speed of the scan mirror unit 162. Further, if an error occurs because the laser beam is not accurately positioned at a center of a reflecting surface of the scan mirror unit 162 or the reflecting surface of the rotating mirror 164 is uneven when the laser beam is irradiated to the object 10 to be processed, the control unit 180 performs the adjustment of the scan mirror unit 162 in the direction of the laser beam incident on the rotating mirror 164 under the control of the scan mirror unit 162 on the basis of the previously analyzed error value, thereby compensating for the error of the laser irradiation device 100. For example, a position sensitivity detector (PSD) may be used to compensate for errors of the laser irradiation device. An error compensation method using the position sensitivity detector will be described in detail below with reference to FIG. 2.

Figure 2:
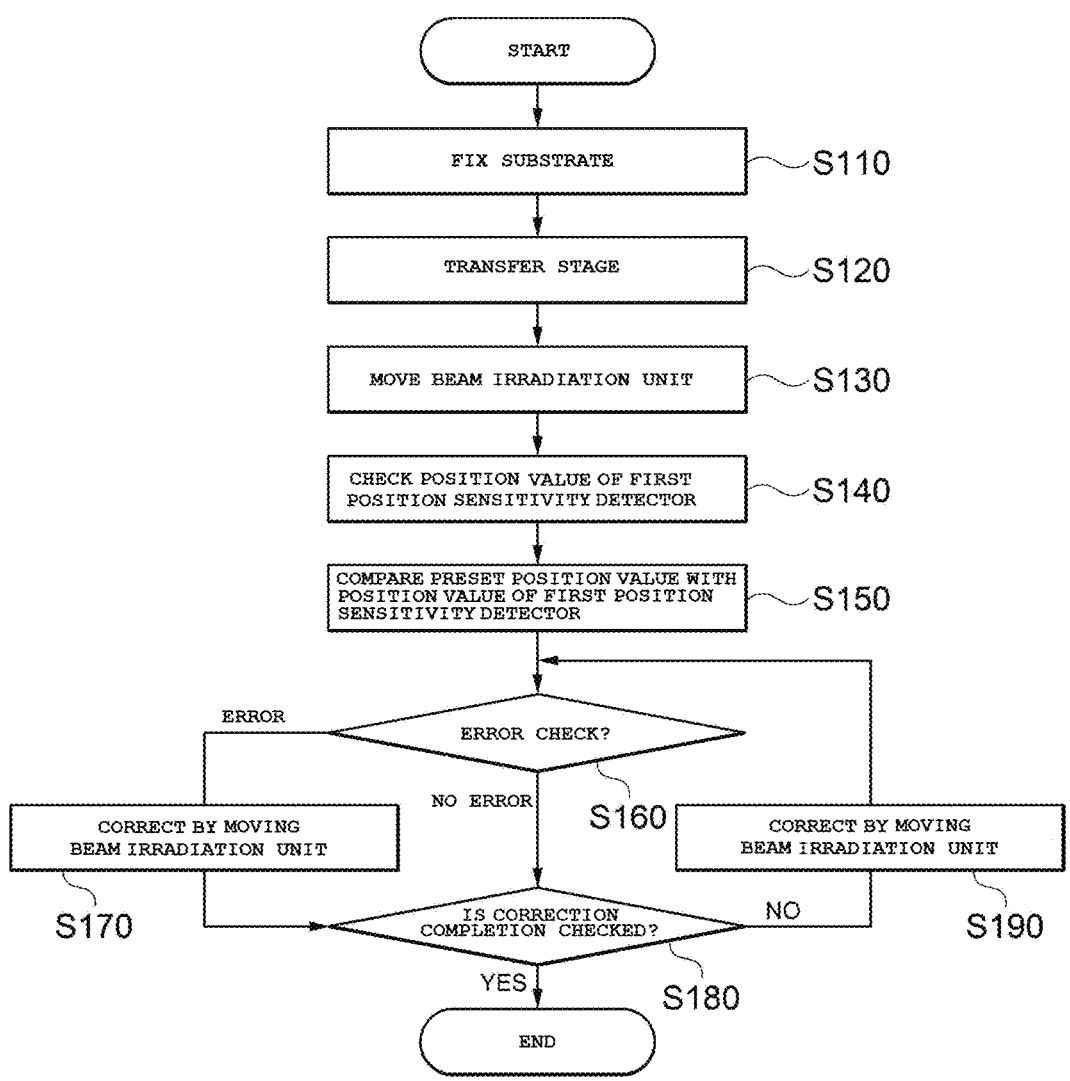
FIG. 2 is a flowchart of an error compensation method using a position sensitivity detector according to an embodiment of the present invention.

FIG. 2 is a flowchart of an error compensation method using a position sensitivity detector according to an embodiment of the present invention.

As shown in FIG. 2, the error compensation method using the position sensitivity detector includes fixing a substrate including a plurality of position sensitivity detectors on the stage 170, instead of the object 10 (S110), transferring the stage 170 so that the laser beam is positioned at the center of the substrate (S120), moving the beam irradiation unit 160 so that the laser beam is positioned at a first position sensitivity detector (S130), detecting a signal output from the first position sensitivity detector and checking a current position value of the first position sensitivity detector based on the detected signal (S140), determining whether the error occurs by comparing the current position value of the first position sensitivity detector with the position value of the predetermined position sensitivity detector (S150), checking the error based on the comparison result (S160), performing a correction so that the checked error position matches the position value of the predetermined position sensitivity detector (S170), completing the correction of all the position sensitivity detectors (S180), and moving the beam irradiation unit to a center of a subsequent position sensitivity detector to recognize an origin point of the subsequent position sensitivity detector (S190).

It is possible to determine whether or not an error has occurred by comparing the current position value of the first position sensitivity detector with the position value of the predetermined position sensitivity detector (S150). If it is determined that the error occurs, the process proceeds to the step S170 of performing the correction so that the checked error position matches the position value of the predetermined position sensitivity detector to move the beam irradiation unit 160 by 1LSB until the beam irradiation unit 160 matches the corrected origin point, thereby correcting the error. When the error correction is completed or when the error does not occur in the determining whether the error occurs (S150), the process proceeds to the completing of the correction of all the position sensitivity detectors (S180), thereby checking whether the correction of all the position sensitivity detectors for the error is completed. If the correction of all the position sensitivity detectors is not yet completed, the process proceeds to the moving of the beam irradiation unit to the center of the second position sensitivity detector to recognize the origin point (S190), thereby moving the beam irradiation unit to the central position of the second position sensitivity detector by a predetermined distance to recognize the origin point. In the completing of the correction of all the position sensitivity detectors through the above operation (S180), when the movement and correction for all the position sensitivity detectors are completed, the error correction may be terminated.

Figure 3:
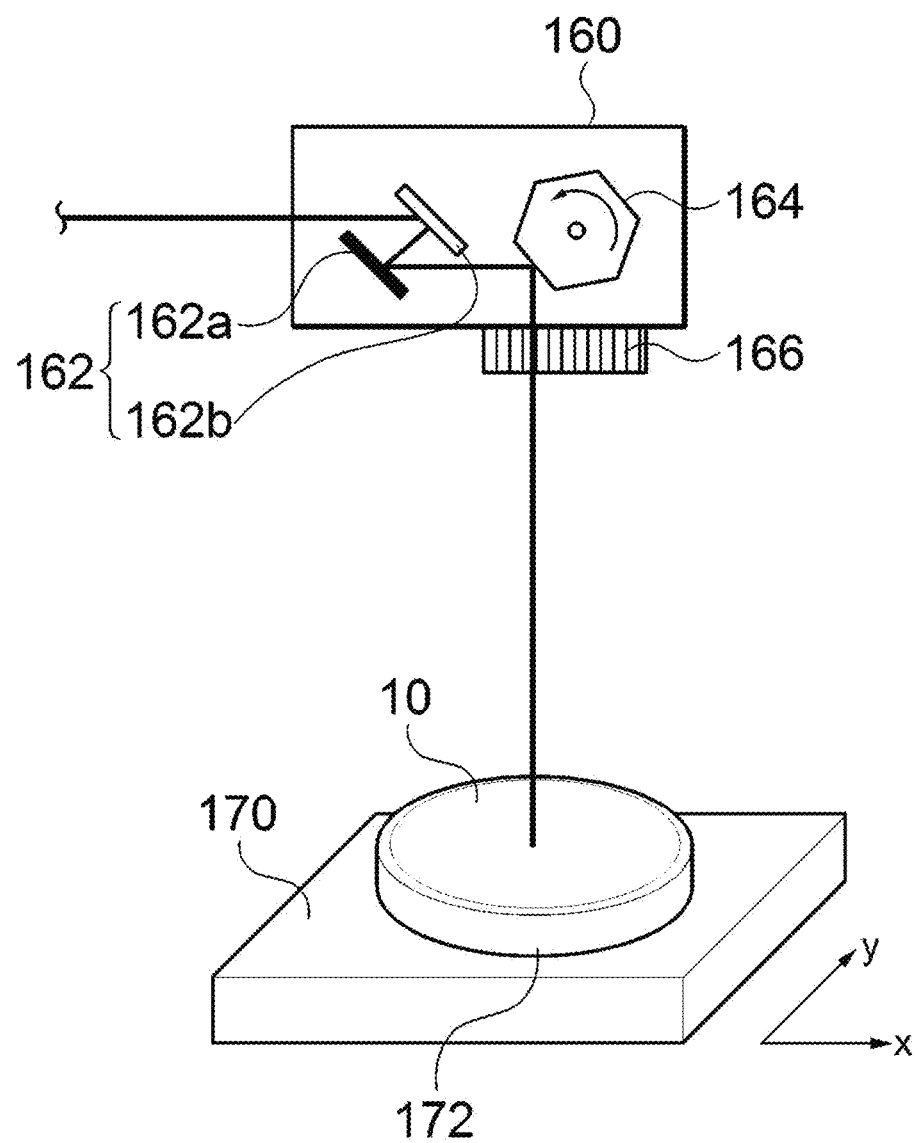
FIG. 3 is a view showing a configuration of a beam irradiation unit and a stage according to an embodiment of the present invention.

FIG. 3 is a view showing a beam irradiation unit and a stage according to an embodiment of the present invention.

Referring to FIG. 3, the beam irradiation unit 160 may include the scan mirror unit 162, the rotating mirror 164, and a scan lens 166. In the following description, the case where the two scan mirrors 162a and 162b are included in the scan mirror unit 162 will be mainly described, but it goes without saying that three or more scan mirrors may be included.

The scan mirror unit 162 may include the plurality of scan mirrors 162a and 162b. The scan mirror unit 162 may adjust and change the position of the laser beam irradiated to the object 10 to be processed by the rotation of the scan mirrors 162a and 162b. For example, the first scan mirror 162a may be rotated clockwise or counterclockwise by setting a protruding direction on the paper face of FIG. 1 as a rotation axis. Accordingly, the first scan mirror 162a may adjust a starting point of the laser beam by adjusting an X-axis irradiation direction of the laser beam irradiated to the object 10 to be processed. In addition, the second scan mirror 162b may be rotated clockwise or counterclockwise by setting left and right directions of the second scan mirror 162b as a rotation axis on the paper face of FIG. 1. Accordingly, the second scan mirror 162b may adjust a Y-axis irradiation direction of the laser beam irradiated to the object 10 to be processed to adjust a gap between the laser beams to be constant. Here, it is described that the first scan mirror 162a adjusts the X-axis irradiation direction and the second scan mirror 162b adjusts the Y-axis irradiation direction. However, the first scan mirror 162a and the second scan mirror 162b may vary depending on the setting of the rotation axis. For example, the first scan mirror 162a may be rotated clockwise or counterclockwise by setting the left and right directions of the first scan mirror 162a on the paper face of FIG. 1 as the rotation axis. Accordingly, the first scan mirror 162a may adjust the Y-axis irradiation direction of the laser beam irradiated to the object 10 to be processed to adjust the gap between the laser beams to be constant. Further, the second scan mirror 162b may be rotated clockwise or counterclockwise by setting the protruding direction on the paper face of FIG. 1 as the rotation axis. Accordingly, the second scan mirror 162b may adjust the starting point of the laser beam by adjusting the X-axis irradiation direction of the laser beam irradiated to the object 10 to be processed. Therefore, the scan mirror unit 162 may use the plurality of scan mirrors 162a and 162b to make the irradiation position of the laser beam all the positions on the surface of the object 10 to be processed.

The rotating mirror 164 may be formed in a polygonal or a circle. Specifically, the rotating mirror 164 may be formed to have a polygonal or circular cross section in the paper face direction of FIG. 3. The rotating mirror 164 may reflect the laser beam incident through the scan mirror unit 162 and make the reflected laser beam reach the object 10 to be processed. The rotating mirror 164 may be rotated at a high speed in order to perform the three-dimensional printing, surface treatment, or debonding process by quickly irradiating the laser beam. The rotation speed may have a value between 100 m/s and 300 m/s depending on the performance of the rotating motor. Preferably, the rotation speed of the rotating mirror 164 may be a value between 160 m/s and 200 m/s. In addition, the rotation direction of the rotating mirror 164 may be a clockwise or counterclockwise direction. The laser beam may be quickly and discontinuously irradiated to the object to be processed through the rotation of the rotating mirror 164. The rotating mirror 164 may use the high-speed rotation to irradiate the discontinuously irradiated beam as the linear laser beam. The irradiation traveling direction of the laser beam to be irradiated with the linear laser beam may be a direction from left to right or a direction from right to left. In addition, the traveling direction of the linear laser beam is not constant and the linear laser beam may be generated by being irregularly mixed from left from right and from right to left. The description of the rotating mirror 164 is described in more detail in FIG. 4.

The scan lens 166 may focus or change the laser beam whose direction is changed by the rotating mirror 164. For example, a spot size having the flat-top shape on the focal plane of the scan lens 166 may be varied within a range from a few micrometers to a few millimeters. In addition, the scan lens 166 may be disposed before the scan mirror unit 162 or after the rotating mirror 164 depending on the application purpose for laser irradiation. For example, the scan lens 166 may be disposed before the scan mirror unit 162 when a size of the object 10 to be processed is large or an area of the surface to be irradiated with the laser beam is large. That is, the scan lens 166 may be disposed before the scan mirror unit 162 to irradiate the laser to a large area. At this point, it is possible to change the size of the beam using the beam expander 140. Further, when the size of the object to be processed is small or the surface to be irradiated with the laser is relatively narrow, the scan lens 166 may be disposed next to the rotating mirror 164. The scan lens 166 is disposed next to the rotating mirror 164, so that a high-quality workpiece may be produced. The scan lens 166 may be replaced depending on the range in which the beam size is changed.

The stage 170 may transfer the object 10 to be processed while the laser beam is irradiated. The transfer direction may be the X-axis direction or the Y-axis direction. For example, the transfer direction may be a direction perpendicular to the linear laser beam formed by the rotation of the rotating mirror 164. Further, the moving speed of the stage 170 may be interlocked with the second mirror 162b that adjusts the Y-axis direction gap between the lasers irradiated by adjusting the position in the Y-axis direction in which the laser beam is irradiated by the scan mirror unit 162. For example, the speed at which the stage 170 is transferred may be relatively slower that that at which the second scan mirror 162b is rotated, and therefore the gap between the lasers may be finely adjusted by the rotation of the second scan mirror 162b while the stage 170 transfers the object 10 to be processed. Further, the laser can be repeatedly irradiated within a predetermined interval. It is possible to irradiate the laser at faster speed when the interval is adjusted by interlocking the stage 170 with the second scan mirror 162b than when the interval is adjusted by moving only the stage 170.

Figure 4:
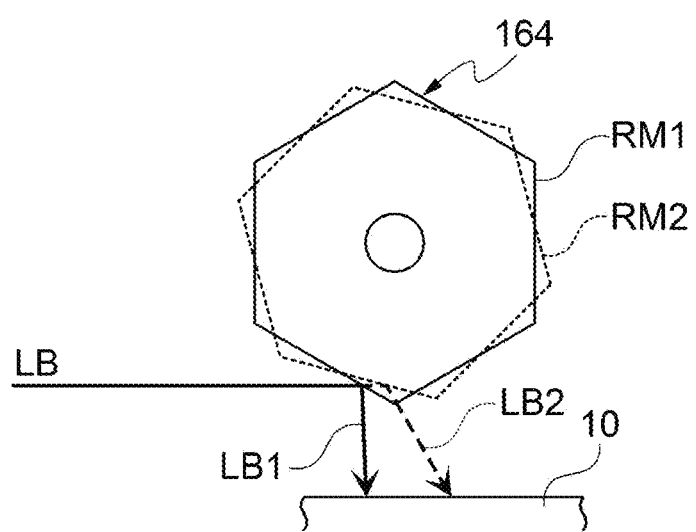
FIG. 4 is a view showing beam irradiation using a rotating mirror according to an embodiment of the present invention.

FIG. 4 is a view showing beam irradiation using a rotating mirror according to an embodiment of the present invention.

As shown in FIG. 4, the rotating mirror 164 may be rotated to irradiate the laser beam while the reflecting direction of the laser beam moves in the X-axis direction. In the following description, the case in which a cross section of the rotating mirror 164 has a hexagonal shape is mainly described, but it is needless to say that the cross section of the rotating mirror 164 may have a polygonal shape or a circular shape (or an elliptical shape). That is, the rotating mirror 164 may be formed to have a polygonal or circular cross section in the paper face direction of FIG. 4.

The rotating mirror 164 may reflect the incident laser beam and make the reflected laser beam reach the object 10 to be processed. The rotary mirror 164 may rotate at a high speed in a clockwise or counterclockwise direction about the paper face direction of FIG. 4. The rotation speed may have a value between 100 m/s and 300 m/s depending on the performance of the rotating motor. Preferably, the rotation speed of the rotating mirror 164 may be a value between 160 m/s and 200 m/s. The laser beam may be irradiated to the object 10 to be processed as the linear laser beam by the high-speed rotation of the rotating mirror 164. The irradiation progress direction of the laser beam to be irradiated with the linear laser beam may be a direction from left to right or a direction from right to left. In addition, the traveling direction of the linear laser beam is not constant and the linear laser beam may be generated by being irregularly mixed from left from right and from right to left.

Describing in more detail, as shown in FIG. 4, the laser beam incident on the rotating mirror 164 and reflected toward the object to be processed 10 is reflected depending on the point where the laser beam is incident on the rotating mirror 164, and thus the positions where the reflected laser beam reaches the object 10 to be processed may be different. That is, as shown in FIG. 4, it may be checked that the positions where a laser beam LB reaches the object 10 to be processed are different depending on the rotation position of the rotating mirror 164, under the assumption that the direction in which a laser beam LB is incident on the rotating mirror 164. In FIG. 4, in a rotation position RM1 of the rotating mirror 164 shown by a solid line and a rotation position RM2 of the rotating mirror 164 shown by a broken line, the direction in which the same laser beam LB is reflected by the rotating mirror 164 is changed (LB1 and LB2), which means that the positions where the laser beam reaches the object 10 to be processed are different. Meanwhile, if the rotating mirror 164 is rotated at high speed (rotated by setting the direction coming out from the paper face of FIG. 4 as the rotating axis), the laser beam LB reflected by the rotating mirror 164 is irradiated to a certain linear line continuously or discontinuously on the object to be processed, and thus has a shape of the linear laser beam.

Further, when the cross section of the rotating mirror 164 has a hexagonal or polygonal shape and when the laser beam LB incident on the rotating mirror 164 is incident on a hexagon or a polygonal side (which is described based on the cross section, and therefore represented by the side but has substantially the form of the surface), the position of the laser beam LB is changed on the linear line in a continuous form. Further, since an angle of the hexagonal or polygonal side is discontinuously changed after and before a vertex of the hexagon or the polygon (which is described based on the cross section, and therefore represented by the vertex but has substantially the form of the line), the laser beam LB is displaced in a continuous form on the linear line.

However, since the above-mentioned rotating mirror 164 is rotated at a high speed, the irradiation of the continuous or discontinuous laser beam LB does not affect the formation of the linear laser beam. That is, the laser beam LB is continuously or discontinuously irradiated to different positions on the linear line by the high-speed rotation of the rotating mirror 164, thereby forming the linear laser beam.

In addition, when the cross section of the rotating mirror is formed in a circular shape, the rotation axis of the rotating mirror may be eccentric with the center of the circular shape, such that the linear laser beam may be formed. Further, when the cross surface of the rotating mirror is formed in an elliptical shape, the rotation axis of the rotating mirror may be concentric or eccentric with the center of the elliptical shape.

The reflection angle at which the laser beam is reflected to the object 10 to be processed is changed by changing the point at which the laser contacts the laser beam by the rotation, and thus the laser beam may be irradiated. Further, the laser beam irradiated on the object 10 to be processed can be formed as the linear light, while the contact point is changed at a high speed by the high-speed rotation of the rotating mirror 164.

Figure 5:
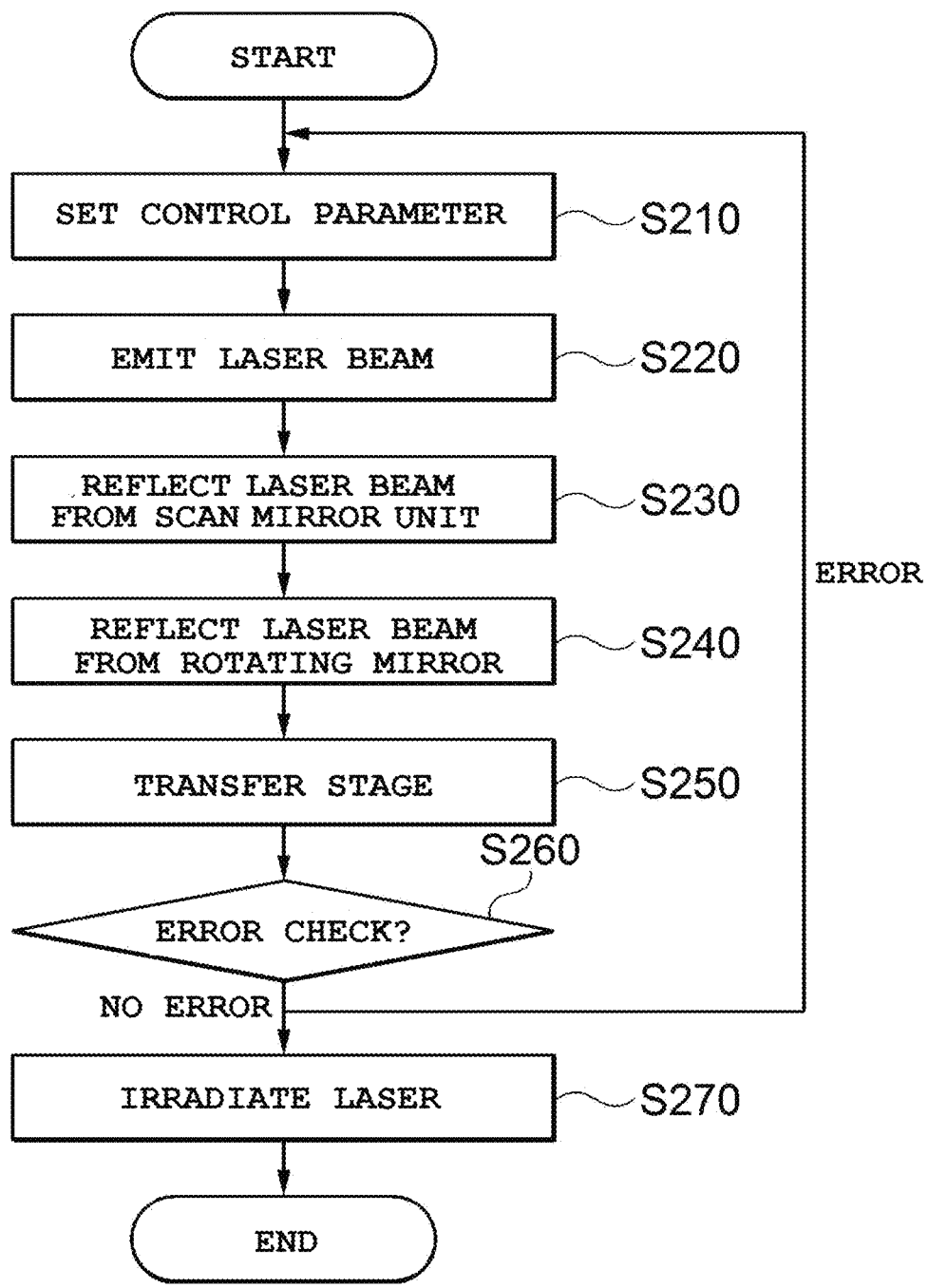
FIG. 5 is a flowchart for explaining a laser irradiation method by a laser irradiation device according to an embodiment of the present invention.

FIG. 5 is a flowchart for explaining a laser irradiation method by a laser irradiation device according to an embodiment of the present invention.

As shown in FIG. 5, a laser irradiation method by a laser irradiation device includes setting, by the control unit 180, control parameters (S210), generating and emitting, by the beam generation unit 110, a laser beam (S220), reflecting, by the scan mirror unit 162, the laser beam (S230), reflecting, by the rotating mirror 164, the laser beam (S240), moving the stage 170 (S250), determining an error value of the laser beam (S260), and irradiating the laser beam to the object to be processed (S270).

In the setting of the control parameters by the control unit 180 (S210), a laser wavelength, a laser pulse, a laser oscillation method, or the like may be set according to the characteristics of the laser beam to be irradiated.

In the generating and emitting of the laser beam by the beam generation unit 110 (S220), the control unit may generate and emit the laser beam as the set value. The laser beam generated by the beam generation unit 110 may have the Gaussian circular beam profile.

In the reflecting of the laser beam by the scan mirror unit 162 (S230), the direction of the laser beam transmitted from the beam generation unit 110 may be adjusted and reflected. The scan mirror unit 162 may include the plurality of scan mirrors 162a and 162b. The first scan mirror 162a may adjust the starting point of the laser beam by adjusting the X-axis irradiation direction of the laser beam irradiated to the object 10 to be processed. The second scan mirror 162b may adjust the Y-axis irradiation direction of the laser beam irradiated to the object 10 to be processed to adjust the gap between the laser beams to be constant.

In the reflecting of the laser beam by the rotating mirror 164 (S240), the scan mirror unit 162 may reflect the direction-adjusted beam to the object 10 to be processed. Further, the rotating mirror 164 may be rotated to irradiate the direction-adjusted laser beam to the object to be processed as the linear laser light. The laser beam is quickly and discontinuously irradiated to the object to be processed through the rotation of the rotating mirror 164. The rotating mirror 164 may use the high-speed rotation to irradiate the discontinuously irradiated beam as the linear laser beam. The irradiation progress direction of the laser beam to be irradiated with the linear laser beam may be a direction from left to right or a direction from right to left. In addition, the traveling direction of the linear laser beam is not constant and the linear laser beam may be generated by being irregularly mixed from left from right and from right to left.

In the moving of the stage 170 (S250), the stage 170 may transfer the object 10 to be processed while the laser beam is irradiated. The stage 170 may have a shape of either a polygon or a circle. The direction in which the stage 170 transfers the object to be processed may be the X-axis direction or the Y-axis direction. For example, the transfer direction may be a direction perpendicular to the linear laser beam formed by the rotation of the rotating mirror 164. Further, the moving speed of the stage 170 may be synchronized with the scan mirror 162b that adjusts the gap between the laser beams by allowing the scan mirror unit 162 to adjust the Y axis of the laser beam. The stage 170 may include the fixing part 172 for fixing the object 10 to be processed. The fixing part 172 may prevent the object 10 from moving while the stage 170 moves.

In the determining of the error value of the laser beam (S260), if an error occurs because the laser beam is not accurately positioned at the center of the reflecting surface of the scan mirror unit 162 or the reflecting surface of the rotating mirror 164 is uneven when the laser beam is irradiated to the object 10 to be processed, the control unit 180 performs the adjustment in the direction of the laser beam incident on the rotating mirror 164 under the control of the scan mirror unit 162 on the basis of the previously analyzed error value, thereby compensating for the error of the laser irradiation device 100.

In the irradiating of the laser to the object to be processed (S270), the laser may be irradiated to the object 10 to be processed positioned at the fixed portion 172 of the stage 170.

The laser irradiation method according to the embodiment of the present invention further includes a step of changing the beam path in accordance with the arrangement relationship of the components of the laser irradiation device, a step of converting a thin parallel beam of the laser beam into a thick parallel beam, or the like.

Figure 6A:
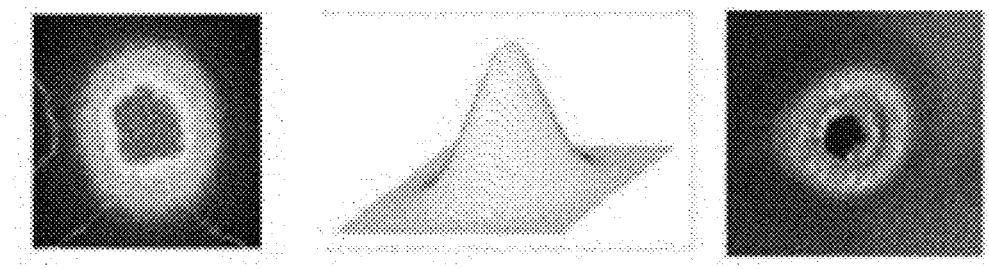
FIGS. 6A-6C are views showing beam profiles of a laser beam incident on and a laser beam emitted from a beam conversion unit constituting a laser irradiation device according to an embodiment of the present invention.
Figure 6B:
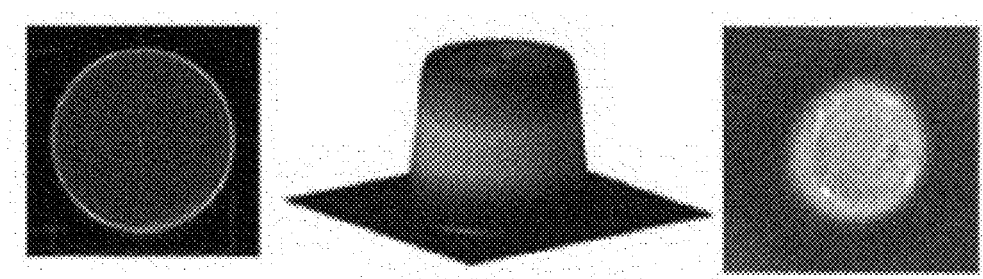
Figure 6C:
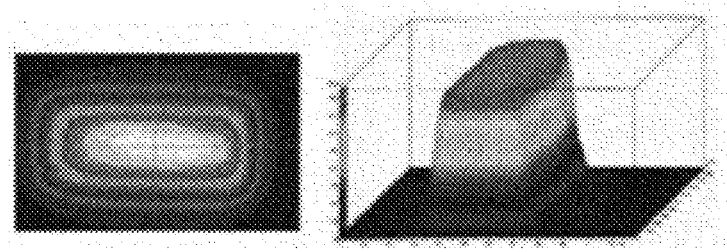

FIGS. 6A-6C are views showing beam profiles of the laser beam incident on and the laser beam emitted from the beam conversion unit (130 in FIG. 1) configuring the laser irradiation device according to an embodiment of the present invention.

FIG. 6A shows the Gaussian circular beam profile of the laser beam incident on the beam conversion unit, FIG. 6B shows the flat-top circular beam profile of the laser beam emitted from the beam conversion unit, and FIG. 6C shows the flat-top square beam profile of the laser beam emitted from the beam conversion unit. In addition, the beam conversion unit may convert the Gaussian circular beam profile of the incident laser beam into have the flat-top line beam profile.

The laser beam of which the beam profile is converted by the beam conversion unit is incident on the beam expander (140 in FIG. 1), and the beam expander converts the thin parallel beam of the incident laser beam into the thick parallel beam.

Here, the beam monitoring unit (150 in FIG. 1) may display a beam profile and a laser power level of the laser beam converted by the beam conversion unit so that the user may recognize the beam profile and the laser power level. In addition, if there is a difference between the preset laser power level in and the recognized laser power level the beam generation unit 110, the laser power level is automatically compensated so that the beam generation unit 110 may generate a laser beam at the preset laser power level. That is, the beam monitoring unit may measure the beam profile and the laser power level of the laser beam reflected by the half mirror (152 in FIG. 1) disposed on the optical path between the beam conversion unit and the beam irradiation unit (160 in FIG. 1) and may correct the measurement result on the basis of the characteristics of the half mirror and display the corrected measurement result to the outside through the external display device (154 in FIG. 1). The user, or the like who has recognized the information displayed by the beam monitoring unit may easily check whether the laser irradiation device (100 in FIG. 1) is normally driven.

Next, the beam irradiation unit may irradiate the laser beam having the flat-top beam profile obtained by the conversion of the beam profile to the object to be processed (10 in FIG. 1), thereby performing the three-dimensional printing, surface treatment, or debonding process for lowering the adhesion of the bonded adhesive. The three-dimensional printing, surface treatment, or debonding process for irradiating the laser beam to the object to be processed by the beam irradiation unit may be performed under the control of a control unit (180 in FIG. 1) such as a computer.

Here, the beam irradiation unit adjusts and changes the position of the laser beam irradiated to the object to be processed by adjusting the arrangement angle of the scan mirrors (162a, 162b in FIG. 1) configuring the scan mirror unit (162 in FIG. 1) and may irradiate the laser beam to the whole surface or an edge area of the object to be processed by any one of a plurality of hatching schemes including line hatching, zigzag hatching, circular hatching, spiral hatching, or cross hatching through the position adjustment and change.

Figure 7:
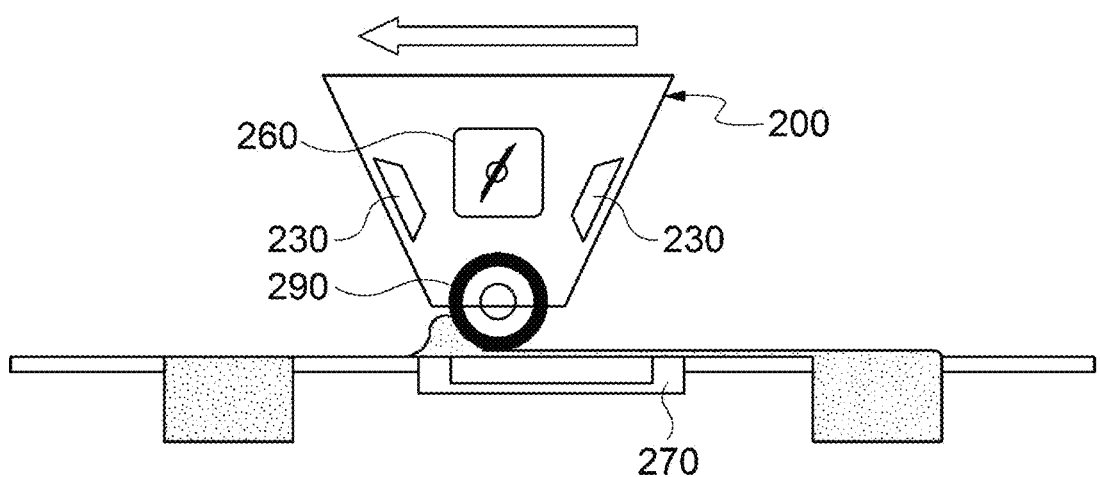
FIG. 7 is a view showing a beam irradiation device and a stage according to a second embodiment of the present invention.
Figure 8:
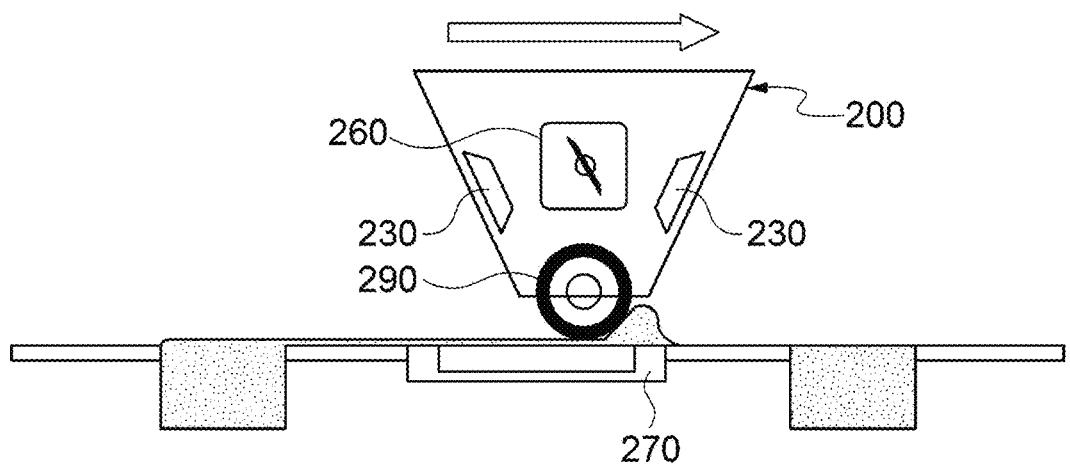
FIG. 8 is a view showing the beam irradiation device and the stage according to the second embodiment of the present invention.

FIGS. 7 and 8 is a view showing the beam irradiation device and the stage according to the second embodiment of the present invention.

Referring to FIGS. 7 and 8, a beam irradiation device 200 may include a beam path changing unit 230, a beam irradiation unit 260, and a powder roller 290.

Here, each configuration and effect of the beam irradiation unit 260 are as described above with reference to FIGS. 1 to 5, and the description of each component of the beam irradiation unit 260 will be omitted.

The beam irradiation device 200 includes the beam irradiation unit 260 disposed therein and a beam path changing unit 230 for changing the direction of the laser beam may be disposed at both ends in the X axis direction about the beam irradiation unit 260. Further, the beam irradiation device 200 may move in either a forward direction or a backward direction about the X axis direction. When the beam irradiation device 200 moves in an X-axis forward direction, the beam irradiation unit 260 irradiates the laser beam in a direction opposite to the moving direction of the laser beam by the driving of the scan mirror unit (162 in FIG. 1), that is, in the backward direction about the X axis. At this time, the beam path changing unit 230 of the beam irradiation device 200 may irradiate the object to be processed with the laser beam irradiated through the beam irradiation unit 260. When the beam irradiation device 200 moves in the X-axis backward direction, the beam irradiation unit 260 may irradiate the laser beam in the direction opposite to the moving direction of the laser beam by the driving of the scan mirror unit (162 in FIG. 1), that is, in the forward direction about the X axis. At this time, the beam path changing unit 230 of the beam irradiation device 200 may irradiate the object to be processed with the laser beam irradiated through the beam irradiation unit 260.

The powder roller 290 may be installed at a lower end of the beam irradiation device 200 in a cylindrical shape. The powder roller 290 may move while evenly spreading powder sprayed on the stage 270 when the beam irradiation device 200 moves.

Figure 9:
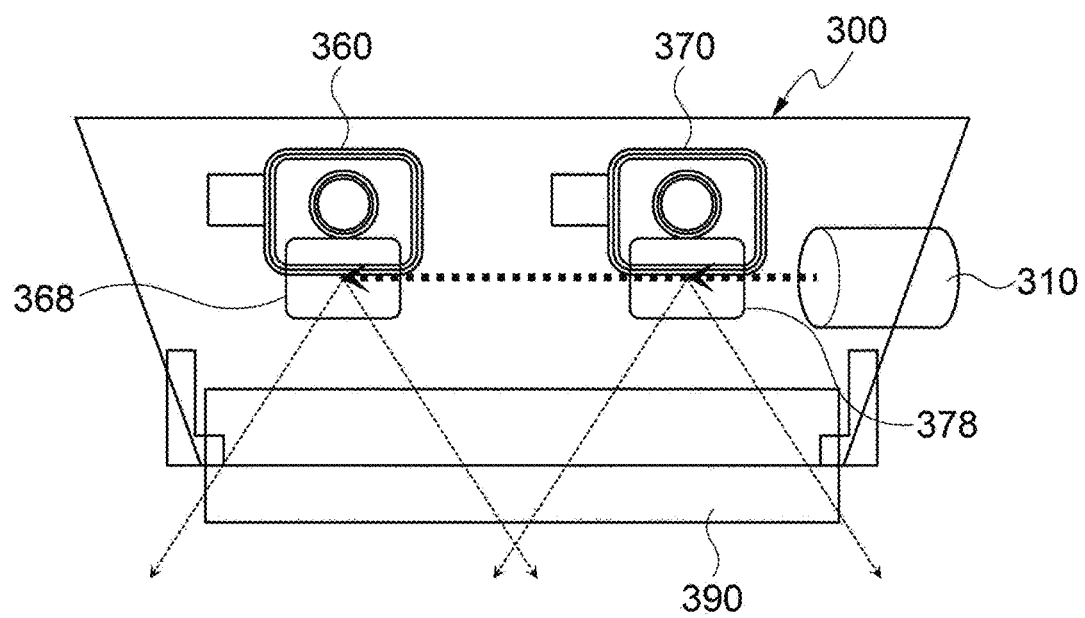
FIG. 9 is a view showing a beam irradiation device and a stage according to a third embodiment of the present invention.
Figure 10:
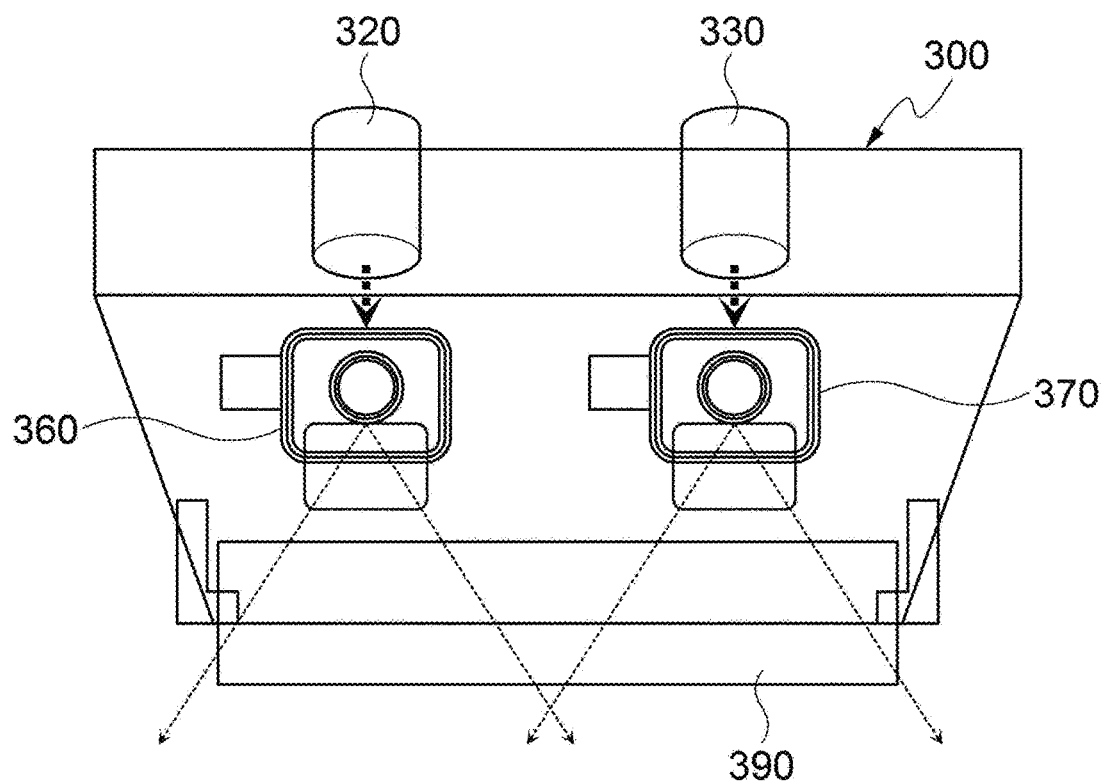
FIG. 10 is a view showing the beam irradiation device and the stage according to the third embodiment of the present invention.

FIGS. 9 and 10 is a view showing a beam irradiation device according to a third embodiment of the present invention.

Referring to FIGS. 9 and 10, a beam irradiation device 300 may include beam irradiation units 360 and 370 and a powder roller 390. In the following description, the case where two beam irradiation units 360 and 370 are included is mainly described, but it goes without saying that three or more beam irradiation units may be included. Here, each configuration and effect of the beam irradiation units 360 and 370 are as described above with reference to FIGS. 1 to 5, and the description of each component of the beam irradiation units 360 and 370 will be omitted.

The beam irradiation units 360 and 370 may further include half mirrors 368 and 378 in addition to each configuration described above with reference to FIGS. 1 to 5.

The beam irradiation unit 360 may be installed on the beam irradiation path. A distance between the beam irradiation units 360 may be adjusted as the user's convenience.

The first half mirror 368 receives the laser beam, and may divide and reflect the laser beam. That is, some of the laser beam may be reflected to the first beam irradiation unit 360 and some thereof may be reflected to the second half mirror 378. The laser beam irradiated to the second half mirror 378 may divide the beam and reflect the beam to the second beam irradiation unit 370 and the third half mirror (not shown). The number of beam irradiation units may be increased in the above-described manner, and thus the laser beam may be irradiated to the large area. That is, as the number of beam irradiation units 360 and 370 is increased, the laser beam may be irradiated to a wider area.

The powder roller 390 may be installed at a lower end of the beam irradiation device 300 in a cylindrical shape. The powder roller 390 may move while evenly spreading powder sprayed on the stage (not shown) when the beam irradiation device 300 moves. A length of the powder roller 390 varies depending on the number of beam irradiation units 360 and may be adjusted or replaced as the convenience of the user.

Hereinabove, the case in which the laser beam irradiated by one beam generation unit 310 is divided using the half mirrors 368 and 378 to be reflected to the plurality of beam irradiation units 360 and 370 is described, but as illustrated in FIG. 7, it is also possible to transmit a beam to each of the plurality of beam irradiation units 360 and 370 using the plurality of beam generation units 320 and 330 to irradiate the laser beam to the large area. At this time, the laser beams emitted from each of the beam generation units 320 and 330 may have different laser wavelengths, laser pulses, and the like. As a result, it is possible to irradiate a large area with a laser beam and produce the high-quality workpiece.

Figure 11:
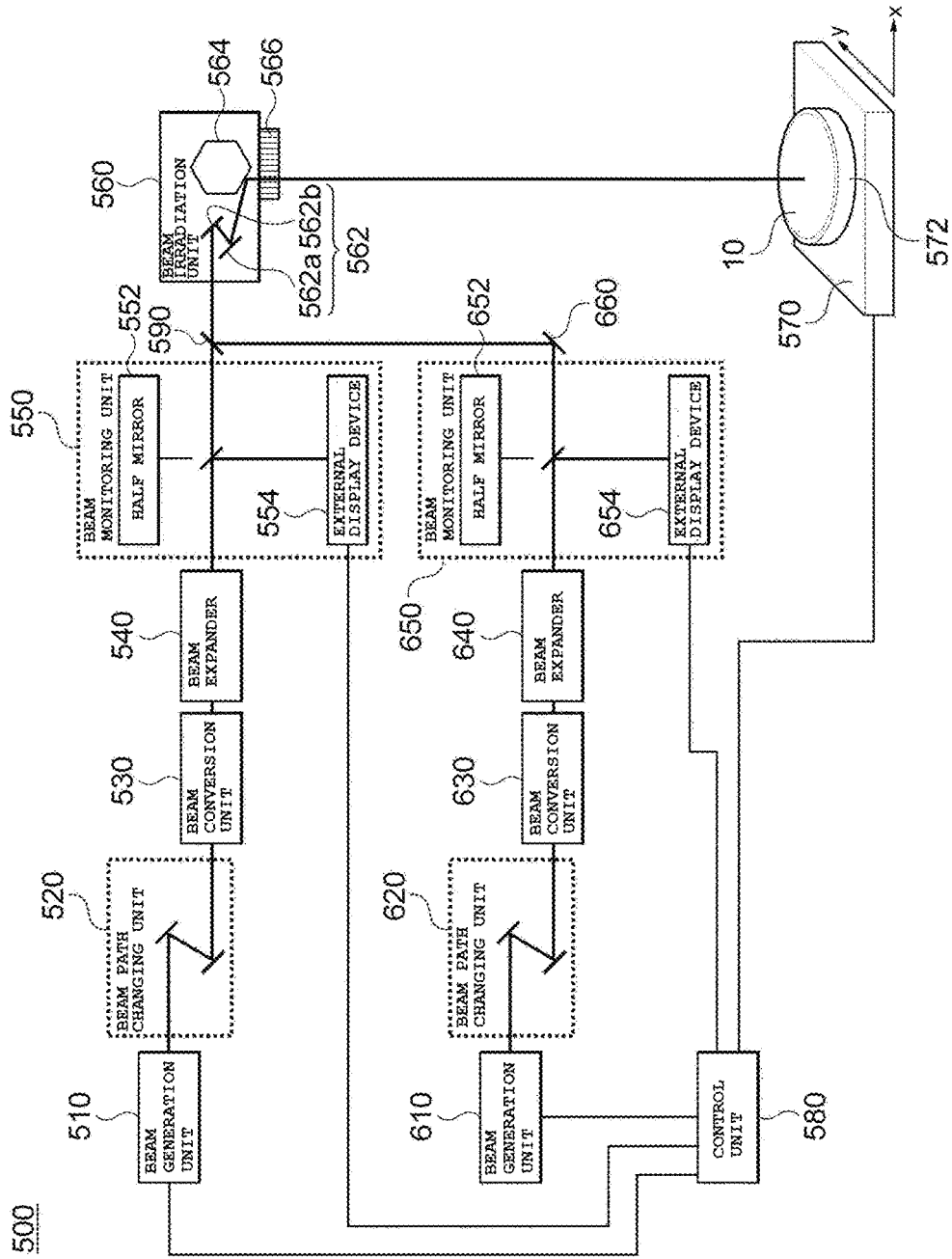
FIG. 11 is a view showing a configuration of a laser irradiation device according to a fourth embodiment of the present invention.

FIG. 11 is a view showing a configuration of a laser irradiation device according to a fourth embodiment of the present invention.

Referring to FIG. 11, a laser irradiation device 500 includes beam generation units 510 and 610, beam path changing unit 520, 620, and 660, beam conversion units 530 and 630, beam expanders 540 and 640, beam monitoring units 550 and 650, a beam irradiation unit 560, a stage 570, a control unit 580, a beam combining optical system 590, and the like.

The beam generation units 510 and 610 may generate laser beams having different laser wavelengths, laser pulses, and the like. Further, a laser oscillation method, and the like may apply different lasers.

The beam combining optical system 590 is for improving laser quality and may combine laser beams emitted from the plurality of beam generation units 510 and 610 and emit the combined laser beams to the beam irradiation unit 560. The combination of the plurality of different laser beams may produce a more uniform and high quality laser processing process. Further, in order to obtain excellent processing quality depending on the material of the object to be processed, the wavelength of the unnecessary beam among the plurality of different laser beams may be removed.

In addition, the beam generation units 510 and 610, the beam path changing units 520, 620 and 660, the beam conversion units 530 and 630, the beam expanders 540 and 640, the beam monitoring units 550 and 650, the beam irradiation unit 560, the stage 570, and the control unit 580 have the same roles and structures as those of the above embodiment.

FIG. 12 is a flowchart for explaining a laser irradiation method by a laser irradiation device according to a fourth embodiment of the present invention.

As shown in FIG. 12, a laser irradiation method using a laser irradiation device includes setting, by the control unit 580, control parameters (S310), generating and emitting, by the plurality of beam generation units 510 and 610, a laser beam (S320), combining, by the beam combining optical system 590, a plurality of laser beams (S330), reflecting, by the scan mirror unit 562, the laser beam (S340), reflecting, by the rotating mirror 564, the laser beam (S350), moving the stage 570 (S360), determining an error value of the laser beam (S370), and irradiating laser to the object to be processed (S380).

In the combining of the plurality of laser beams by the beam combining optical system 590 (S330), the laser beams emitted from the plurality of beam generation units 510 and 610 may be combined to be emitted to the beam irradiation unit 560. Since the laser beams are combined by the beam combining optical system 590, each of the laser beams emitted from the plurality of beam generation units 510 and 610 may have different laser wavelengths, laser pulses, and the like. Further, the laser oscillation method, and the like may apply different lasers. The beam combining optical system 590 may combine the plurality of different laser beams to produce the more uniform and high quality laser processing process. Further, in order to obtain excellent processing quality depending on the material of the object to be processed, the wavelength of the unnecessary beam among the plurality of different laser beams may be removed.

In addition, the setting of the control parameters by the control unit 580 (S310), the generating and emitting of the laser beam by the plurality of beam generation units 510 and 610 (S320), the reflecting of the laser beam by the scan mirror unit 562 (S340), the reflecting of the laser beam by the rotating mirror 564 (S350), the moving of the stage 570 (S360), the determining of the error value of the laser beam (S370), and the irradiating of the laser to the object to be processed (S380) are performed by the same method as the embodiment.

The laser irradiation method according to another embodiment of the present invention may further include a step of changing the beam path in accordance with the arrangement relationship of the components of the laser irradiation device, a step of converting a thin parallel beam of the laser beam into a thick parallel beam, or the like.

DETAILED DESCRIPTION OF MAIN ELEMENTS

10: Object to be processed
100, 200, 300, 500: Laser irradiation device
110, 310, 320, 330, 510, 610: Beam generation unit
120, 230, 520, 620, 660: Beam path changing unit
130, 530, 630: Beam conversion unit
140, 540, 640: Beam expander
150, 550, 650: Beam monitoring unit
152, 552, 652: Half mirror
154, 554, 654: External display device
160, 260, 360, 370, 560: Beam irradiation unit
162, 562: Scan mirror unit
162*a*, 562*a*: First scan mirror
162*b*, 562*b*: Second scan mirror 164, 564: Rotating mirror
166, 566: Scan lens
170, 270, 570: Stage
172, 572: Fixing part
180, 580: Control unit
290, 390: Powder roller
590: Beam combining optical system

The invention claimed is:

1. A laser irradiation device, comprising:
a beam irradiation unit generating a laser beam;
a scan mirror unit comprising a first scan mirror adjusting a start point of the laser beam in a first direction parallel to a processed surface of the object to be processed and a second scan mirror uniformly adjusting a gap between the laser beams in a second direction perpendicular to the first direction, wherein the scan mirror unit adjusts a direction of the laser beam transmitted from the beam irradiation unit using the first scan mirror and the second scan mirror;
a control unit controlling the beam irradiation unit to select a hatching scheme and compensating for an error by adjusting a direction of the laser beam depending on a previously analyzed error in any one of a case in which the error occurs because the laser beam is not accurately positioned at a pre-stored position of a reflecting surface of the scan mirror unit or a case in which the error occurs because a reflecting surface of the rotating mirror is uneven;
a stage having an object to be processed thereon, and moving the object to be processed in a pre-stored direction; and
a rotating mirror reflecting the laser beam of which the direction is adjusted by the scan mirror unit,
wherein the rotating mirror is provided to be rotatable so that the direction-adjusted laser beam is irradiated to an object to be processed while forming a linear laser beam on the object,
wherein the first scan mirror of the scan mirror unit adjusts the start point of the laser beam by adjusting the X-axis irradiation direction of the laser beam irradiated to the object to be processed and the second scan mirror of the scan mirror unit adjusts the gap between the laser beams to be constant by allowing the scan mirror unit to adjust the Y axis of the laser beam,
wherein the moving speed of the stage is synchronized with the scan mirror unit, and
wherein the beam irradiation unit is transferred under the control of the control unit to adjust the start point of the laser beam and the gap between the laser beams by adjusting an arrangement angle of the first scan mirror and the second scan mirror of the scan mirror unit and is capable of irradiating the laser beam to the whole surface or an edge area of the object to be processed by line hatching, zigzag hatching, circular hatching, spiral hatching, or cross hatching through a position adjustment and change.

2. The laser irradiation device of claim 1, wherein the beam irradiation unit has a Gaussian circular beam profile.

3. The laser irradiation device of claim 1, further comprising:
a beam conversion unit converting the laser beam into any one of a flat-top circular beam profile, a flat-top square beam profile, and a flat-top line beam profile.

4. The laser irradiation device of claim 1, wherein the laser beam is irradiated on the object to be processed to perform any one of three-dimensional printing, surface treatment, and debonding processes.

5. The laser irradiation device of claim 1,
wherein the stage transfers the object in state of being interlocked with the second scan mirror adjusting in the second direction.

6. The laser irradiation device of claim 5, wherein the stage includes a fixing part for fixing the object to be processed.

7. The laser irradiation device of claim 6, wherein the control unit uses a position sensitivity detector to compensate for an error of the laser irradiation device.

8. The laser irradiation device of claim 1, further comprising:
at least one or more other beam irradiation units for generating laser beams and combining different laser beams generated by the beam irradiation unit and the at least one or more other beam irradiation units.

9. The laser irradiation device of claim 1, further comprising:
a beam irradiation device moving a beam irradiation unit that includes the scan mirror unit and the rotating mirror.

10. The laser irradiation device of claim 9, wherein the beam irradiation device further includes a beam conversion unit that the laser beam of the beam irradiation unit is reflected to the object to be irradiated.

11. The laser irradiation device of claim 9, wherein the beam irradiation device further includes: a powder roller evenly spreading powder sprayed on the stage.

12. The laser irradiation device of claim 1, further comprising:
a half mirror separating and transmitting the laser beam generated from the beam irradiation unit into a plurality of laser beams; and
a plurality of hybrid type scan heads,
wherein the hybrid type scan head includes the scan mirror unit and the rotating mirror.

13. The laser irradiation device of claim 1, further comprising:
a plurality of hybrid type scan heads,
wherein at least one of the hybrid type scan heads includes the scan mirror unit and the rotating mirror, and
wherein the laser irradiation device further comprises at least one or more other beam irradiation units, and each of the beam irradiation unit and the at least one or more other beam irradiation units irradiates respective laser beam to each of the hybrid type scan heads.

14. The laser irradiation device of claim 12, wherein any one of three-dimensional printing, surface treatment, and debonding processes is performed.

15. The laser irradiation device of claim 12, further comprising:
a powder roller evenly spreading powder sprayed on the stage.

* * * * *